US010822067B2

(12) United States Patent
Ezaki et al.

(10) Patent No.: US 10,822,067 B2
(45) Date of Patent: Nov. 3, 2020

(54) POWER SYSTEM OF SHIP

(71) Applicant: KAWASAKI JUKOGYO KABUSHIKI KAISHA, Kobe-shi (JP)

(72) Inventors: Hideaki Ezaki, Akashi (JP); Masato Hayashi, Kobe (JP); Masanori Hamamatsu, Kobe (JP); Soichiro Bando, Kobe (JP); Kazuma Tokuyama, Kobe (JP); Tatsuya Ohno, Nishinomiya (JP); Kazuya Takeda, Kobe (JP); Yasunori Kujime, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 45 days.

(21) Appl. No.: 16/074,520

(22) PCT Filed: Jan. 30, 2017

(86) PCT No.: PCT/JP2017/003237
§ 371 (c)(1),
(2) Date: Aug. 1, 2018

(87) PCT Pub. No.: WO2017/135199
PCT Pub. Date: Aug. 10, 2017

(65) Prior Publication Data
US 2019/0039707 A1 Feb. 7, 2019

(30) Foreign Application Priority Data
Feb. 1, 2016 (JP) ................................. 2016-017470

(51) Int. Cl.
*B63H 21/20* (2006.01)
*B63H 21/17* (2006.01)
(Continued)

(52) U.S. Cl.
CPC ............. *B63H 21/20* (2013.01); *B63H 21/14* (2013.01); *B63H 21/17* (2013.01); *B63J 3/02* (2013.01);
(Continued)

(58) Field of Classification Search
CPC ............ B63H 21/17; B63H 21/20; H02J 3/24
See application file for complete search history.

(56) References Cited

U.S. PATENT DOCUMENTS 3,467,853 A * 9/1969 Harland, Jr. ........ H01L 27/0825
322/28
10,389,126 B2 * 8/2019 Kearns ..................... H02J 3/24
(Continued)

FOREIGN PATENT DOCUMENTS

JP 2013-163486 A 8/2013
JP 2015-003658 A 1/2015
(Continued)

OTHER PUBLICATIONS

English Translation of JP-2015-003658 A (Year: 2015).*

*Primary Examiner* — Sean Gugger
(74) *Attorney, Agent, or Firm* — Oliff PLC

(57) ABSTRACT

A power system of a ship includes a first power storage device, a second power storage device, and a control system. The first power storage device has an energy density higher than that of the second power storage device. The second power storage device has a power density higher than that of the first power storage device. The control system is configured to: as a power generator application, prioritize discharging the first power storage device over discharging the second power storage device, such that base power is continuously supplied to an onboard electrical load connected to an onboard bus; and as a grid stabilization application, prioritize charging/discharging the second power storage device over charging/discharging the first power (Continued)

storage device to compensate for frequency variation or voltage variation of an onboard power grid.

9 Claims, 12 Drawing Sheets

(51) Int. Cl.

| | | |
|---|---|---|
| *H02J 3/46* | (2006.01) | |
| *H02P 9/04* | (2006.01) | |
| *B63J 3/02* | (2006.01) | |
| *H02J 3/24* | (2006.01) | |
| *H02J 3/38* | (2006.01) | |
| *B63H 21/14* | (2006.01) | |
| *B63J 99/00* | (2009.01) | |
| *H01M 10/42* | (2006.01) | |
| *H02J 7/00* | (2006.01) | |

(52) U.S. Cl.
CPC .......... *B63J 99/00* (2013.01); *H01M 10/4264* (2013.01); *H02J 3/24* (2013.01); *H02J 3/38* (2013.01); *H02J 3/46* (2013.01); *H02J 7/0013* (2013.01); *H02J 7/0063* (2013.01); *H02P 9/04* (2013.01); *B63H 2021/205* (2013.01); *H02J 2007/0067* (2013.01); *H02J 2207/10* (2020.01); *Y02T 70/5236* (2013.01)

(56) References Cited

U.S. PATENT DOCUMENTS

| | | | |
|---|---|---|---|
| 2009/0156068 A1* | 6/2009 | Barrett | B60W 10/30 440/3 |
| 2011/0012352 A1* | 1/2011 | Nelson | F03D 7/0272 290/44 |
| 2012/0235473 A1 | 9/2012 | Jiang et al. | |
| 2014/0008988 A1* | 1/2014 | Clarke | H02J 3/40 307/84 |
| 2014/0074311 A1* | 3/2014 | Kearns | H02J 3/38 700/297 |
| 2014/0103727 A1* | 4/2014 | Taimela | H02J 3/24 307/76 |
| 2014/0114495 A1* | 4/2014 | Larsson | H02J 3/1828 700/297 |
| 2014/0218985 A1* | 8/2014 | Yu | H02M 7/537 363/97 |
| 2015/0263567 A1* | 9/2015 | Kolhatkar | G05F 3/02 307/23 |
| 2019/0072070 A1* | 3/2019 | Wang | F03D 7/0284 |

FOREIGN PATENT DOCUMENTS

| | | |
|---|---|---|
| JP | 2015-227110 A | 12/2015 |
| WO | 2013/146773 A1 | 10/2013 |
| WO | 2015/182158 A1 | 12/2015 |

\* cited by examiner

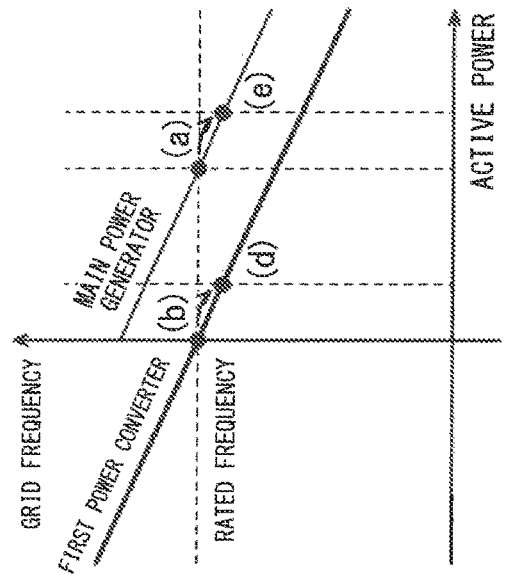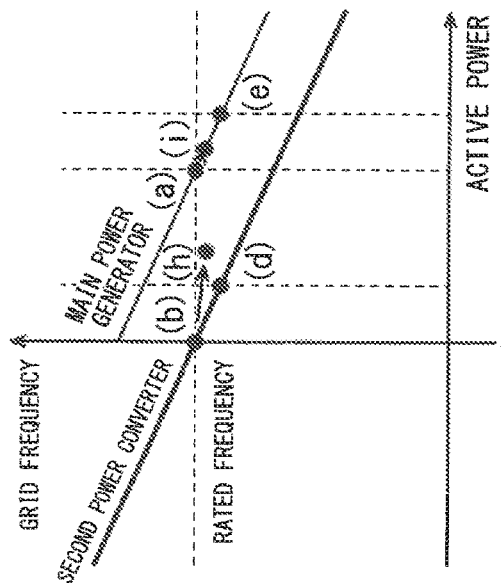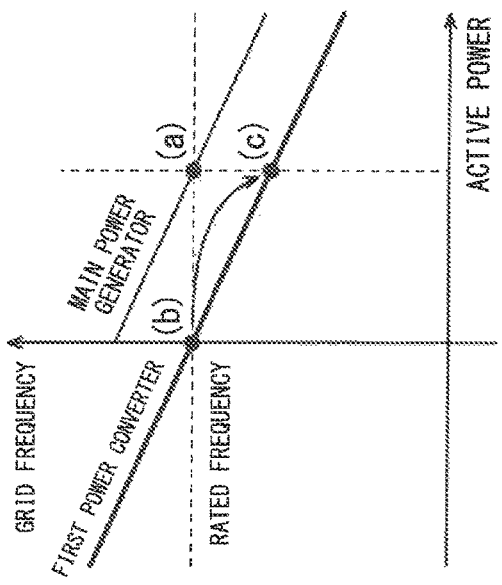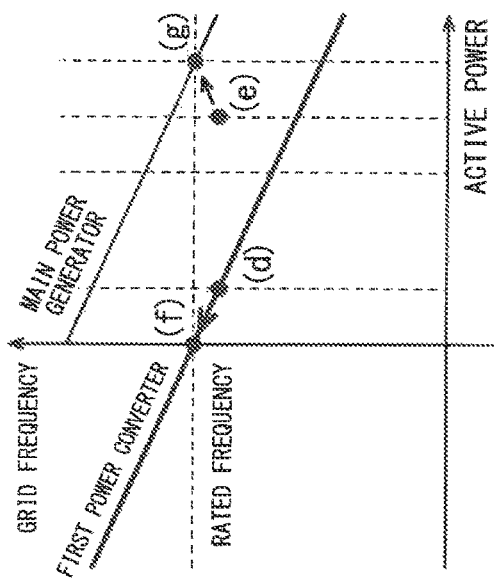

POWER SYSTEM OF SHIP

TECHNICAL FIELD

The present invention relates to a power system of a ship

BACKGROUND ART

Various electrically propelled ships mounted with secondary batteries, such as electrically propelled tugboats, have been put into practical use. For example, Patent Literature 1 discloses a ship in which a power storage device is provided on a power feed line of the ship, and thereby the ship is capable of supplying electric power to a propulsion motor and supplying electric power for use in the ship. In recent years, a ship realizing zero emission in a harbor has been put into practical use. The ship is mounted with lithium ion batteries as secondary batteries, and eliminates the necessity of starting the engine while the ship is moored or is being electrically propelled at low speed.

CITATION LIST

Patent Literature

PTL 1: U.S. Patent Application Publication No. 2009/0156068

SUMMARY OF INVENTION

Technical Problem

While a ship is travelling or performing particular work, the power load in the ship or the propeller thrust load of the ship temporarily varies to a great degree, which may cause engine tripping, resulting in a risk of power failure in the ship or a risk of the ship becoming non-maneuverable, and may cause the emission of harmful black exhaust from the engine. In order to reduce such risks and emission, it is desired to utilize power storage devices as energy sources to compensate for the load variation. However, in such application, high power is required although the power consumption is small. In this respect, since the power density of secondary batteries is low, the installation of large-sized secondary batteries is necessary, which is unrealistic in view of the installation space of the secondary batteries in the ship and the cost thereof.

In view of the above, an object of the present invention is to realize, in a power system of a ship, both supplying electric power for use in the ship and compensating for load variation by using power storage devices in a limited space in the ship.

Solution to Problem

A power system of a ship according to one aspect of the present invention includes: a first power storage device mounted to an onboard bus; a second power storage device mounted to the onboard bus; and a control system configured to control charging/discharging of the first power storage device and the second power storage device. The first power storage device has an energy density higher than that of the second power storage device. The second power storage device has a power density higher than that of the first power storage device. The control system is configured to: as a power generator application, prioritize discharging the first power storage device over discharging the second power storage device, such that base power is continuously supplied to an onboard electrical load connected to the onboard bus; and as a grid stabilization application, prioritize charging/discharging the second power storage device over charging/discharging the first power storage device to compensate for frequency variation or voltage variation of an onboard power grid.

According to the above configuration, base power, i.e., electric power for operating hotel loads or propelling the ship at a constant speed, is continuously supplied to the onboard electrical load by the first power storage device having a higher energy density, and frequency variation or voltage variation of the onboard power grid is compensated for by the second power storage device having a higher power density. That is, by suitably using the different power storage devices in accordance with the above different applications, even though the total size of the power storage devices is small, these power storage devices can be applied to the power system of the ship.

The ship may include a propulsion system configured such that a propeller is connected to a main engine and connected to a propulsion motor, a shaft generator, or a propulsion motor generator. The control system may be configured to, as a main engine load variation compensation application, prioritize charging/discharging the second power storage device over charging/discharging the first power storage device to adjust driving of, or electric power generated by, the propulsion motor, the shaft generator, or the propulsion motor generator to reduce load variation of the main engine.

According to the above configuration, when load variation of the main engine occurs in the propulsion system, the second power storage device having a higher power density is charged/discharged to adjust the driving of, or electric power generated by, the propulsion motor, the shaft generator, or the propulsion motor generator, and thereby the load variation of the main engine can be suitably reduced.

A power system of a ship according to another aspect of the present invention includes: a first power storage device mounted to an onboard bus; a second power storage device mounted to the onboard bus; and a control system configured to control charging/discharging of the first power storage device and the second power storage device. The first power storage device has an energy density higher than that of the second power storage device. The second power storage device has a power density higher than that of the first power storage device. The control system: when using at least one of the first power storage device and the second power storage device in at least one of a power generator application for continuously supplying base power to an onboard electrical load connected to the onboard bus and a grid stabilization application for compensating for frequency variation or voltage variation of an onboard power grid, obtains a first predetermined value and a second predetermined value for each application, the first predetermined value corresponding to electrical energy of necessary charging/discharging for the application, the second predetermined value corresponding to electric power of the necessary charging/discharging for the application; if the first predetermined value is greater than the second predetermined value, prioritizes charging/discharging the first power storage device over charging/discharging the second power storage device, and if the second predetermined value is greater than the first predetermined value, prioritizes charging/discharging the second power storage device over charging/discharging the first power storage device.

According to the above configuration, by suitably using the different power storage devices in accordance with the magnitude of electrical energy and the magnitude of electric power of the necessary charging/discharging for each application, even though the total size of the power storage devices is small, these power storage devices can be applied to the power system of the ship.

The ship may include a propulsion system configured such that a propeller is connected to a main engine and connected to a propulsion motor, a shaft generator, or a propulsion motor generator. The control system may: when using at least one of the first power storage device and the second power storage device in at least one of the power generator application, the grid stabilization application, and a main engine load variation compensation application for adjusting driving of, or electric power generated by, the propulsion motor, the shaft generator, or the propulsion motor generator to reduce load variation of the main engine, obtain the first predetermined value and the second predetermined value for each application, the first predetermined value corresponding to electrical energy of necessary charging/discharging for the application, the second predetermined value corresponding to electric power of the necessary charging/discharging for the application; if the first predetermined value is greater than the second predetermined value, prioritize charging/discharging the first power storage device over charging/discharging the second power storage device; and if the second predetermined value is greater than the first predetermined value, prioritize charging/discharging the second power storage device over charging/discharging the first power storage device.

The first power storage device may be a secondary battery, and the second power storage device may be a capacitor. Generally speaking, since charging and discharging of a secondary battery are chemical reactions, the number of available charge/discharge cycles of a secondary battery is less than that of a capacitor. According to the above configuration, the life of the entire power system can be extended by using the capacitor (the second power storage device), whose power density is higher than that of the secondary battery (the first power storage device), for a short-time charging/discharging application, in which the number of times of charging/discharging is large.

The power system of the ship may include: a main power generator connected to the onboard bus; and a first power converter connected between the onboard bus and the first power storage device. In the power generator application, the control system may control the first power converter such that when the first power storage device is able to supply, alone or in parallel with the main power generator, electric power at least to the onboard electrical load, if an unexpected output shortage of the main power generator occurs, the electric power is automatically discharged from the first power storage device.

According to the above configuration, the redundancy of the onboard power grid can be secured without performing stand-by operation by starting a stand-by generator in addition to the main power generator that is generating electric power. This makes it possible to reduce the fuel consumption and wear on the power generator.

The power system of the ship may include: a main power generator connected to the onboard bus; and a second power converter connected between the onboard bus and the second power storage device. In the grid stabilization application, the control system may control the second power converter such that charged/discharged power of the second power storage device has a droop characteristic against frequency or voltage, and such that a speed at which frequency variation or voltage variation of the second power storage device follows active power variation is slower than a speed at which frequency variation or voltage variation of the main power generator or the first power storage device follows the active power variation.

According to the above configuration, by utilizing droop control characteristics, load variation of the onboard electrical load can be compensated for without detecting the state of the onboard electrical load.

The power system of the ship may include a second power converter connected between the onboard bus and the second power storage device. In the grid stabilization application, the control system may detect load variation of the onboard electrical load, and may control the second power converter to adjust charged/discharged power of the second power storage device, such that the load variation is reduced.

According to the above configuration, charging/discharging of the second power storage device is performed based on the detection of load variation of the electrical load. This makes it possible to actively compensate for load variation of the onboard electrical load. For example, load variation of the electrical load may be directly detected by a power meter(s) installed on the electrical load and/or an electric power source, or may be estimated based on frequency variation or voltage variation of the power grid.

In the main engine load variation compensation application, the control system may detect load variation of the main engine, and may control the second power converter to adjust charged/discharged power of the second power storage device, such that the load variation is reduced.

According to the above configuration, charging/discharging of the second power storage device is performed based on the detection of load variation of the main engine. This makes it possible to actively compensate for load variation of the main engine. For example, load variation of the main engine may be directly detected, or may be estimated based on, for example, rotational speed variation of the main engine.

The first power storage device or the second power storage device may be connected to the onboard bus of the ship, which is an AC bus, via separate power converters.

The first power storage device or the second power storage device may be connected to the onboard bus of the ship, which is a DC bus, via separate power converters.

Alternatively, the ship may include a power converter for driving a motor generator or an electric motor, and the first power storage device or the second power storage device may be connected to a DC link of the power converter via separate power converters.

Advantageous Effects of Invention

The present invention makes it possible to realize, in a power system of a ship, both supplying electric power for use in the ship and compensating for rapid load variation by using power storage devices in a limited space in the ship.

The above and other objects, features, and advantages of the present invention will more fully be apparent from the following detailed description of preferred embodiments with accompanying drawings.

BRIEF DESCRIPTION OF DRAWINGS

FIGS. 4A to 4D show droop characteristic lines that are used for performing droop control of power storage devices in the control system.

DESCRIPTION OF EMBODIMENTS

Figure 1:
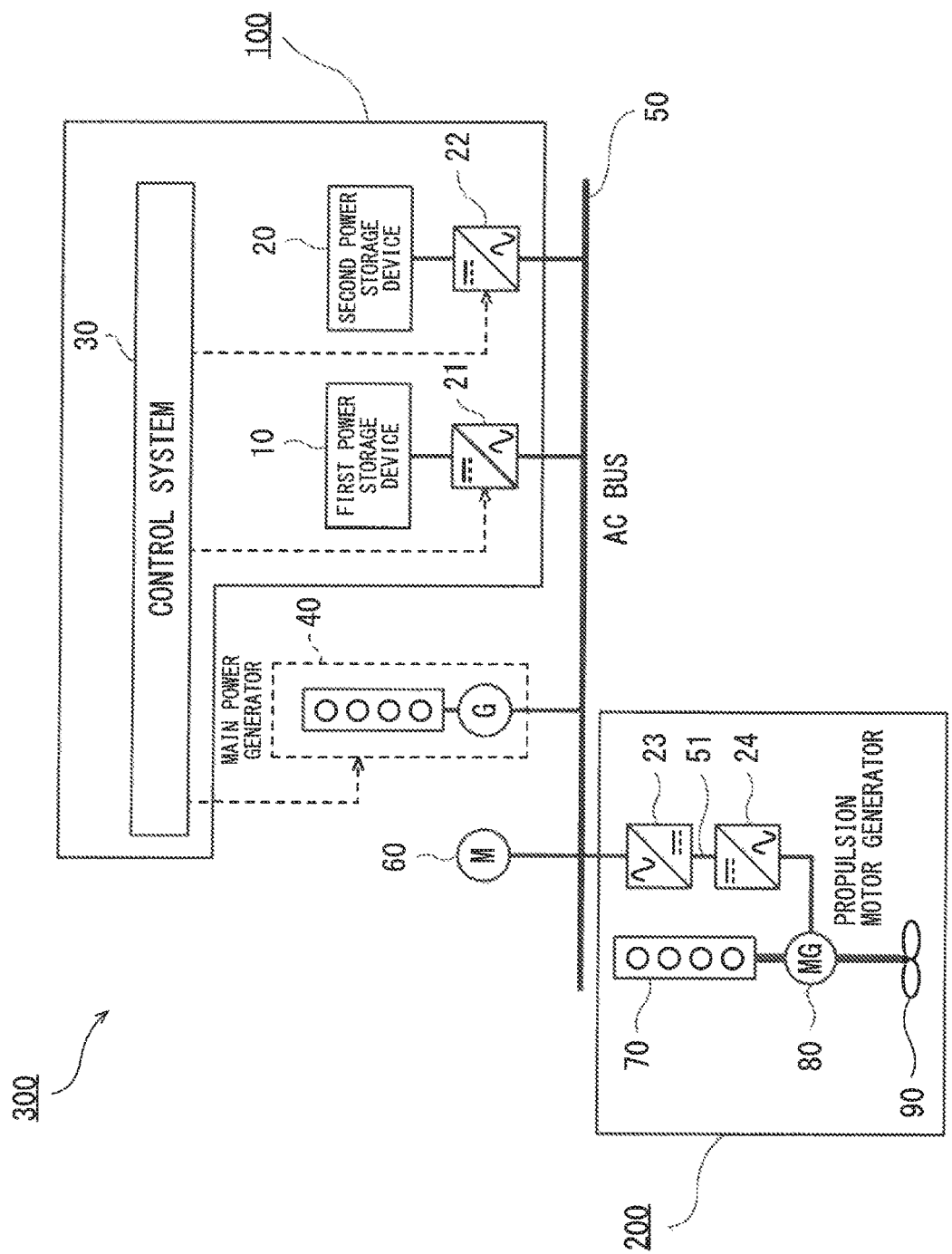
FIG. 1 schematically shows the configuration of a ship including a ship power system according to Embodiment 1.

Hereinafter, embodiments of the present invention are described with reference to the drawings. In the drawings, the same or corresponding elements are denoted by the same reference signs, and repeating the same descriptions is avoided below.

Embodiment 1

FIG. 1 schematically shows the configuration of a ship including a ship power system 100 according to Embodiment 1. As shown in FIG. 1, in a ship 300, an onboard AC bus 50 is connected to a main power generator 40, a first power storage device 10 via a first power converter 21, a second power storage device 20 via a second power converter 22, onboard loads 60, and a propulsion system 200 of the ship 300.

The configuration of the propulsion system 200 of the ship 300 (hereinafter, simply referred to as the propulsion system 200) varies depending on the type of the ship. Typical examples of the ship 300, which is mounted with the ship power system 100 of the present invention (hereinafter, simply referred to as the power system 100), include a hybrid ship, an electrically propelled ship, a mechanically propelled ship mounted with a shaft generator, and other mechanically propelled ship. In the present embodiment, the ship 300 is a hybrid ship. The propulsion system 200 includes a main engine 70 serving as a main driving source of a propeller 90, a motor generator 80 serving as an auxiliary driving source of the propeller 90, a third power converter 23, and a fourth power converter 24. The motor generator 80 is mechanically connected to the main engine 70, and also mechanically connected to the propeller 90 via a gear reducer (not shown). The motor generator 80 is electrically connected to the fourth power converter 24, and the fourth power converter 24 is connected to the third power converter 23 via a DC link 51. The third power converter 23 is connected to the onboard bus 50. In the hybrid ship, the motor generator 80 receives electric power from the main power generator 40, which is connected to the onboard bus 50, via the third power converter 23 and the fourth power converter 24, and generates and supplies driving force to the propeller 90 to assist the main engine 70 in driving the propeller 90. The motor generator 80 also receives motive power from the main engine 70, and generates and supplies electric power to the onboard bus 50 via the fourth power converter 24 and the third power converter 23 to assist the main power generator 40 in supplying electric power to the onboard bus. Alternatively, the main power generator 40 may be stopped, and the motor generator 80 may serve as a main electric power source.

Generally speaking, the propulsion system 200 in the hybrid ship has four operation modes, i.e., an electric propulsion mode, a propulsion assisting mode, a mechanical propulsion mode, and a shaft generator mode. The electric propulsion mode is an operation mode in which the motor generator 80 is operated as an electric motor to drive the propeller 90 by electric propulsive force. The propulsion assisting mode is an operation mode in which the motor generator 80 is operated as an electric motor to assist the thrust of the main engine 70. The mechanical propulsion mode is an operation mode in which the motor generator 80 is stopped from operating and the propeller 90 is driven only by the thrust of the main engine 70. The shaft generator mode is an operation mode in which the motor generator 80 is operated as a shaft generator to assist the main power generator 40 in generating electric power, and the propeller 90 is driven by the thrust of the main engine 70. Alternatively, the main power generator 40 may be stopped. In other words, the operation in the electric propulsion mode corresponds to the operation of the propulsion system of an electrically propelled ship; the operation in the mechanical propulsion mode corresponds to the operation of the propulsion system of a mechanically propelled ship; and the operation in the shaft generator mode corresponds to the operation of the propulsion system of a mechanically propelled ship mounted with a shaft generator.

The main power generator 40 is a main electric power source that supplies electric power to the propulsion motor generator 80 and the onboard loads 60 of the ship. A plurality of main power generators 40 may be provided. Normally, while the ship 300 is travelling, the main power generator 40 covers electric power used by the electric motor or motor generator used for propelling the ship 300, and also covers electric power used in the ship 300. If the electric power thus used varies very greatly, then engine tripping may occur, causing a risk of the supply of electric power from the main power generator 40 being cut off.

The power system 100 is connected, as an auxiliary power supply, to the propulsion motor generator 80 and the onboard loads 60 of the ship via the onboard bus 50. While the ship is moored or travelling at low speed around a harbor, the power system 100 can be operated as a sole electric power source that supplies electric power in the ship. This makes it possible to realize zero emission in the harbor. In a case where power load variation is great as mentioned above, the power system 100 performs load variation compensation in order to prevent engine tripping. At the time, the power system 100 assists the main power generator 40 in supplying electric power to the loads 60 as necessary, or receives and stores electric power from the main power generator 40. Each of the onboard loads 60 is a device that consumes electric power. A plurality of onboard loads 60 are provided herein. Each onboard load 60 is connected to the onboard bus 50. Examples of the onboard loads 60 include: equipment that operates continuously, such as hotel loads including lighting/air conditioning equipment of the ship; and devices that operate for a short time, such as a winch and an engine starter motor of the main engine 70. In the description herein, electric power steadily consumed by equipment that operates continuously is referred to as base power. It should be noted that since the thruster load hardly varies while the ship is travelling at low speed around a harbor, the thruster load at the time can be considered as base power. However, the thruster load varies greatly while the ship is performing work or under stormy weather.

The power system 100 includes the first power storage device 10, the second power storage device 20, the first power converter 21, the second power converter 22, and a control system 30. The first power storage device 10 has an energy density higher than that of the second power storage device 20, and the second power storage device 20 has a power density higher than that of the first power storage device 10. In the present embodiment, the first power storage device 10 is a secondary battery, and the second power storage device 20 is a capacitor. The secondary battery is a high-capacity electrical storage device that stores electric charges via chemical reactions, and releases the stored electric charges via reverse reactions. Examples of the secondary battery include a lithium ion battery, a nickel metal hydride battery, and a lead battery. The capacitor is a high-power electrical storage device that directly stores electric charges (i.e., without any reactions) and directly releases the stored electric charges. Examples of the capacitor include a lithium ion capacitor, an electric double-layer capacitor, a nanohybrid capacitor, and a carbon nanotube capacitor.

Generally speaking, since charging and discharging of a secondary battery are chemical reactions, the number of available charge/discharge cycles of a secondary battery is less than that of a capacitor. Therefore, the life of the entire power system 100 can be extended by using the capacitor (the second power storage device), whose power density is higher than that of the secondary battery (the first power storage device), for a short-time charging/discharging application, in which the number of charge/discharge cycles is large.

The control system 30 is configured as an arithmetic operation device. The control system 30 is configured to control the main power generator 40, and also control the charging/discharging of the first power storage device 10 and the second power storage device 20 in accordance with the application of the power system 100. The control system 30 is configured to, as a power generator application, prioritize discharging the first power storage device 10 over discharging the second power storage device 20, such that base power is continuously supplied to the onboard electrical loads 60. The control system 30 is also configured to, as a grid stabilization application, prioritize charging/discharging the second power storage device 20 over charging/discharging the first power storage device 10 to compensate for frequency variation if the ship's onboard power grid is an AC grid and compensate for voltage variation if the onboard power grid is a DC grid. The control system 30 is also configured to, as a main engine load variation compensation application, prioritize charging/discharging the second power storage device 20 over charging/discharging the first power storage device 10 to adjust the driving of, or electric power generated by, the propulsion motor generator 80 (or the electric motor or the shaft generator) to reduce the load variation of the main engine 70.

Figure 2:
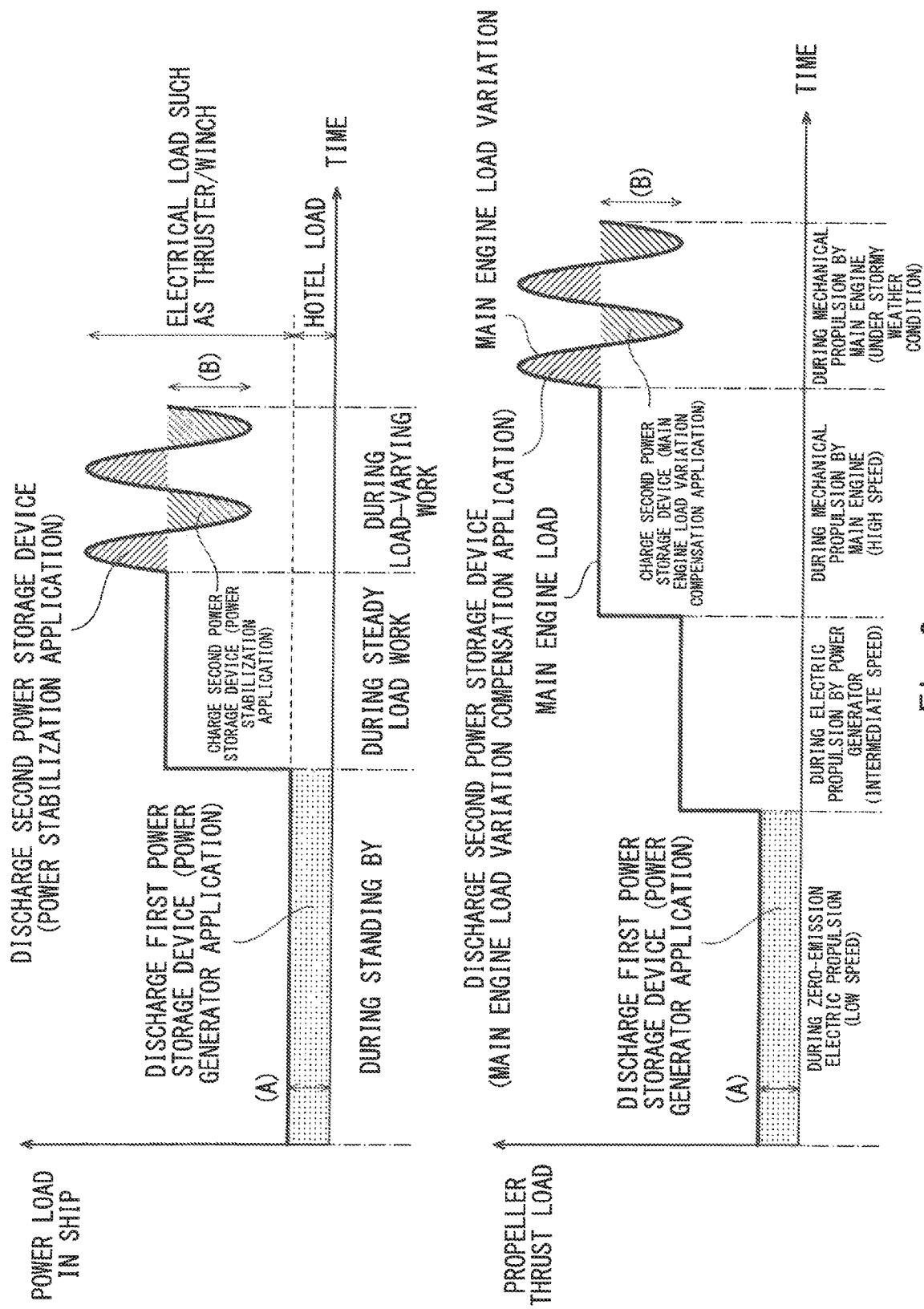
FIG. 2 is a graph schematically showing temporal variation of the power load in the ship and temporal variation of the main engine load of the ship.

FIG. 2 is a graph schematically showing typical temporal variation of the power load in the ship and typical temporal variation of the propulsion load of the main engine of the ship. As shown in the upper part of FIG. 2, in a case where the ship 300 stands by in a harbor, minimum necessary onboard loads are used. Therefore, necessary base power (A) is small. However, necessary electrical energy is great since the stand-by time is long. For this reason, as the power generator application, the first power storage device 10 having a higher energy density is used. On the other hand, in a case where the ship 300 performs work using a thruster, winch, or the like, causing load variation, necessary electric power (B) for load variation compensation is greater than the base power (A). Therefore, as the grid power stabilization application, the second power storage device 20 having a higher power density is used.

As shown in the lower part of FIG. 2, in a case where the ship 300 is propelled at low speed around a harbor in the electric propulsion mode, a minimum necessary propulsion load is used. Therefore, necessary base power (A) is small. However, necessary electrical energy is great if the mooring time around the harbor is long. As one example, in the case of a hybrid tugboat, necessary electric power during mooring is about 50 kW, and necessary electrical energy for mooring for one night is about 400 kWh. Therefore, as the power generator application, the first power storage device 10 having a higher energy density is used. On the other hand, in a case where the ship 300 is propelled at high speed by the main engine 70 in the mechanical propulsion mode under a stormy weather condition, necessary electric power (B) for load variation compensation is greater than the necessary electric power (A) for the power generator application. In the case of the aforementioned tugboat, maximum electric power used for load variation compensation is about 1000 kW for each of charging and discharging. However, as shown in FIG. 2, since charging and discharging are repeated alternately within one cycle, electric power consumption is merely a loss caused by a power converter and the like. Therefore, as the main engine load variation compensation application, the second power storage device 20 having a higher power density is used. Thus, by using the first power storage device 10 having a higher energy density as the power generator application and using the second power storage device 20 having a higher power density as the grid power stabilization application and the main engine load variation compensation application, the total size of the power storage devices can be reduced.

For example, assume that a secondary battery having an energy density of 0.1 kWh/kg and a power density of 0.1 kW/kg can be utilized as the first power storage device 10, and a capacitor having an energy density of 0.01 kWh/kg and a power density of 1 kW/kg can be utilized as the second power storage device 20. Here, in order to satisfy the aforementioned operation conditions (electrical energy of 400 kWh, electric power of 1000 kW) only by the secondary battery, it is necessary to prepare 10 t of the secondary batteries (output power of 1000 kW). On the other hand, in order to satisfy the aforementioned operation conditions by the combination of the secondary battery and the capacitor, it is only necessary to prepare 4 t of the secondary batteries (capacity of 400 kWh) and 1 t of the capacitors (output power of 1000 kW). Thus, in the latter case, the total weight is 5 t, which is the half of the total weight in the case where only the secondary batteries are used.

Figure 3:
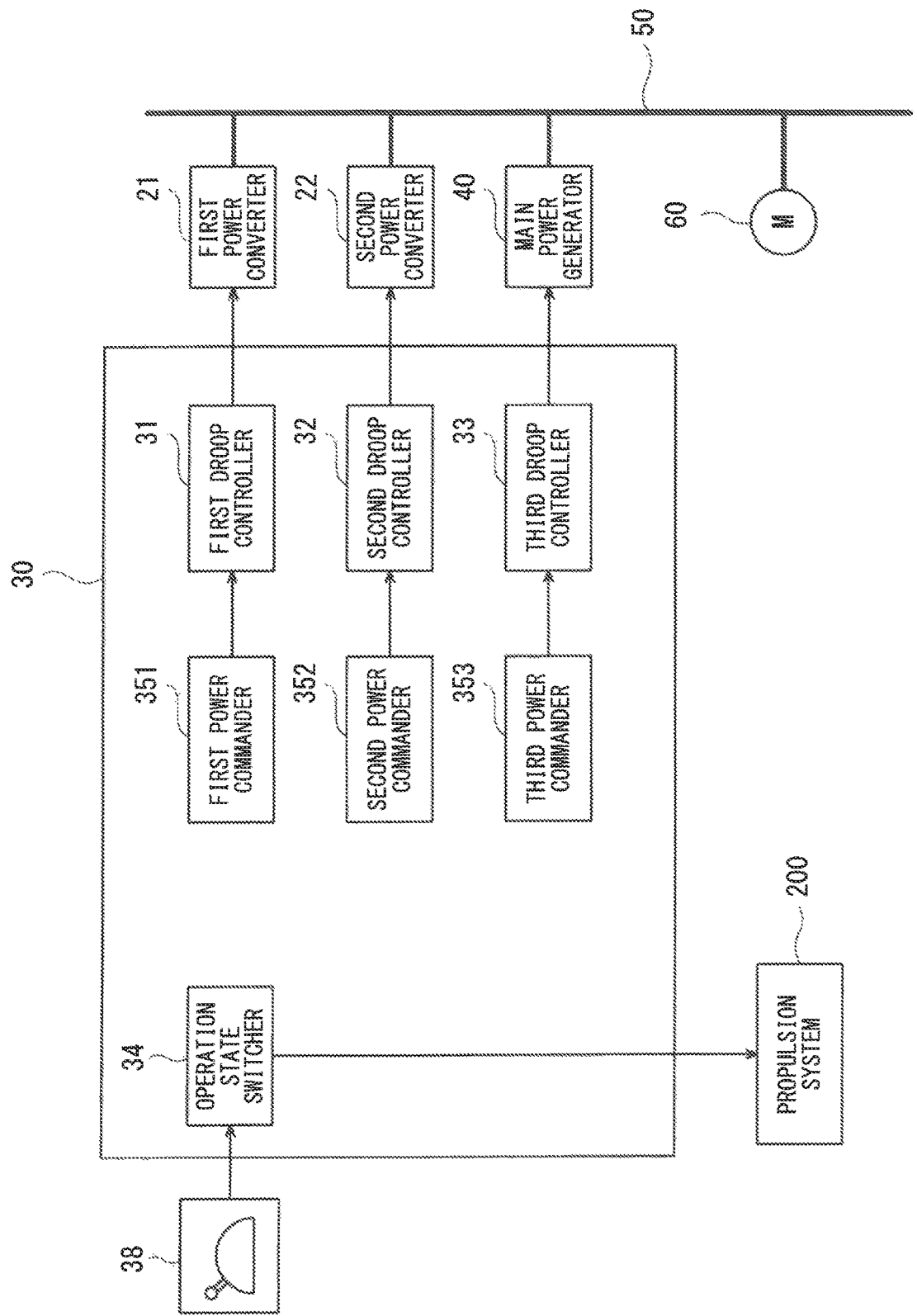
FIG. 3 is a block diagram showing the configuration of a control system of FIG. 1.

Next, the configuration of the control system 30 is described with reference to a block diagram shown in FIG. 3. As shown in FIG. 3, the control system 30 includes a first droop controller 31, a second droop controller 32, a third droop controller 33, an operation state switcher 34, a first power commander 351, a second power commander 352, and a third power commander 353. Each of these components is a function that is realized as a result of a program being executed by the arithmetic operation device. It should be noted that the functions of the first droop controller 31, the second droop controller 32, and the third droop controller 33 may be incorporated in a program of an arithmetic operation device of the first power converter 21, a program of an arithmetic operation device of the second power converter 22, and a program of an engine control device of the main power generator 40, respectively. The functions of the first power commander 351, the second power commander 352, and the third power commander 353 may be incorporated in a program of a power management system that manages electric power supply and demand of the ship, or may be incorporated in a program of a control device in which the operation state switcher 34 is stored.

In accordance with operation information from a console 38, the operation state switcher 34 switches the operation state of the ship 300. For example, the operation state switcher 34 selects the operation mode of the propulsion system 200 based on operation information indicative of the position of a lever provided on the console 38, the operation information being inputted by the lever, and starts/stops component devices of the propulsion system 200. The main power generator 40 may be started/stopped by the operation state switcher 34, or may be started/stopped by the power management system.

In the power generator application, the first droop controller 31 controls the first power converter 21 such that when the first power storage device 10 is able to supply, alone or in parallel with the main power generator 40, electric power at least to the onboard electrical loads 60, if an unexpected output shortage of the main power generator 40 occurs, the electric power is automatically discharged from the first power storage device 10. In general, the operation of a main power generator controlled by droop control can be automatically switched between self-sustained operation and parallel operation with an electric power source such as another main power generator even without receiving a switching signal from the outside. Similarly, the operation of the first droop controller 31 can be automatically switched between self-sustained operation and parallel operation with an electric power source such as another main power generator/power storage device even without receiving a switching signal from the outside.

Hereinafter, specific control performed by the first droop controller 31 is described by taking one example where the grid is an AC grid. FIGS. 4A to 4D show droop characteristic lines that are used for droop control of the power storage devices in the control system 30. As shown in FIGS. 4A to 4D, the droop characteristic is the relationship between active power (which is positive during electric power generation) and the grid frequency, and is set such that the greater the active power, the lower the grid frequency. A value resulting from dividing the difference between the frequency at the time of rated load and the frequency at the time of no load by a rated frequency is defined as a droop rate. Normally, the droop rate is set to the same value for each electric power source. However, as an alternative, the droop rate may be set to a different value for each electric power source as necessary.

The first droop controller 31 detects the active power, and determines a frequency target value based on the droop characteristic. The arithmetic operation device of the first power converter 21 calculates a voltage target value or current target value based on the frequency target value, and performs voltage control or current control of the first power converter 21. Desirably, the speed at which frequency variation follows load variation is set to be the same as that of the main power generator. Specifically, a dynamic model such as an oscillation equation of the main power generator may be simulated, or the frequency target value may be passed through a low-pass filter.

The first power commander 351, the second power commander 352, and the third power commander 353 raise/lower the droop characteristic lines of the first droop controller 31, the second droop controller 32, and the third droop controller 33, respectively, thereby giving commands to the first droop controller 31, the second droop controller 32, and the third droop controller 33, respectively, the commands specifying the distribution of electric power to the onboard electrical loads 60. Alternatively, the first power commander 351, the second power commander 352, and the third power commander 353 may give commands to the first droop controller 31, the second droop controller 32, and the third droop controller 33, respectively, each command specifying the value of the active power indicated by the droop characteristic line, the value corresponding to the rated frequency. Since the first power converter 21 is droop-controlled, the first power storage device 10 is capable of both supplying electric power to all the onboard electrical loads 60 by self-sustained operation and supplying electric power to part of the onboard electrical loads 60 while operating in conjunction with the main power generator 40.

Alternatively, the first power storage device 10 is used instead of a stand-by generator. At the time, each of the third power commander 353 and the first power commander 351 sets the droop characteristic, such that the main power generator operates at a point (a) and the first power converter 21 operates at a point (b) in FIG. 4A. That is, while the main power generator 40 is operating normally, the main power generator 40 covers the entire load. In a case where tripping of the main power generator 40 has occurred, then as shown in FIG. 4A, the first power storage device 10 covers the entire load, and the operating point converges to a point (c) as indicated by an arrow. Although the frequency is lowered, the supply of electric power to the onboard loads 60 is continued without causing a power failure. Next, as shown in FIG. 4B, for example, when the power load of the onboard loads 60 increases, the operating points of the main power generator 40 and the first power converter 21 converge from the point (a) and the point (b) to a point (e) and a point (d) shown in FIG. 4B, respectively, as indicated by arrows. Accordingly, the first power storage device 10 discharges electric power temporarily. Thereafter, as a power management function, the third power commander 353 adjusts the droop characteristic of the main power generator 40 as shown in FIG. 4C. Accordingly, the operating points of the main power generator 40 and the first power converter 21 shift to a point (g) and a point (f), respectively. As a result, the supply of electric power to the onboard loads 60 is performed solely by the main power generator 40 again. The first power storage device 10, whose state of charge has decreased due to the discharging, may be charged at a suitable timing while the ship is travelling or the ship is at a berth. As described above, by performing the droop control of the first power converter 21 as the power generator application, the redundancy of the onboard power grid can be secured by the first power storage device 10 without a stand-by generator and its stand-by operation. This makes it possible to reduce the fuel consumption and wear on the main power generator 40.

In the grid stabilization application, the second droop controller 32 controls the second power converter 22 such that the charged/discharged power of the second power storage device 20 has a droop characteristic against the grid frequency, and such that the speed at which frequency variation of the second power storage device 20 follows load variation of the onboard electrical loads 60 is slower than the speed at which frequency variation of the main power generator 40 or the first power storage device 10 follows the load variation of the onboard electrical loads 60.

The second droop controller 32 detects the active power, and determines a frequency target value based on the droop characteristic. The arithmetic operation device of the second power converter 22 calculates a voltage target value or current target value based on the frequency target value, and performs voltage control or current control of the second power converter 22. The speed at which frequency variation of the second power storage device 20 follows load variation is set to be slower than the speed at which frequency variation of the main power generator 40 or the other first power storage device 10 follows the load variation. Specifically, a dynamic model such as an oscillation equation of a power generator with greater inertia may be simulated, or the frequency target value may be passed through a low-pass filter with a greater time constant.

The operations of the third power commander 353 and the second power commander 352 are shown in FIG. 4D. Normally, the main power generator 40 operates at the point (a), and the second power converter 22 operates at the point (b). In a case where the onboard loads 60 (e.g., a thruster and a winch) are used, stepped load variation occurs, which causes a situation where the frequency of the second power converter 22 varies more slowly than the other electric power sources. Meanwhile, since the power grid has such a nature that the power load is equivalent to the sum of generated power, and the frequency is the same throughout the entire grid, the operating points of the main power generator 40 and the second power converter 22 shift to a point (i) and a point (h), respectively, and then gradually converge to a point (e) and a point (d), respectively. Accordingly, the second power converter 22 temporarily covers large part of the load variation, and thereby the load variation of the main power generator 40 can be reduced.

The third droop controller 33 detects the active power, determines a frequency target value based on the droop characteristic, and performs rotational speed control of a prime mover (e.g., an engine or turbine) of the main power generator 40. The speed at which frequency variation follows load variation depends on mechanical characteristics, such as the inertia of the power generator.

According to the present embodiment, base power is continuously supplied to the onboard electrical loads 60 by the first power storage device 10 having a higher energy density, and frequency variation or voltage variation of the onboard power grid is compensated for by the second power storage device 20 having a higher power density. When load variation of the main engine 70 occurs, the second power storage device 20 having a higher power density is charged/discharged to adjust the driving of, or electric power generated by, the propulsion motor generator 80, and thereby the load variation of the main engine 70 can be suitably reduced. That is, by suitably using the different power storage devices in accordance with the above different applications, even though the total size of the power storage devices is small, these power storage devices can be applied to the ship power system 100.

Figure 3A:
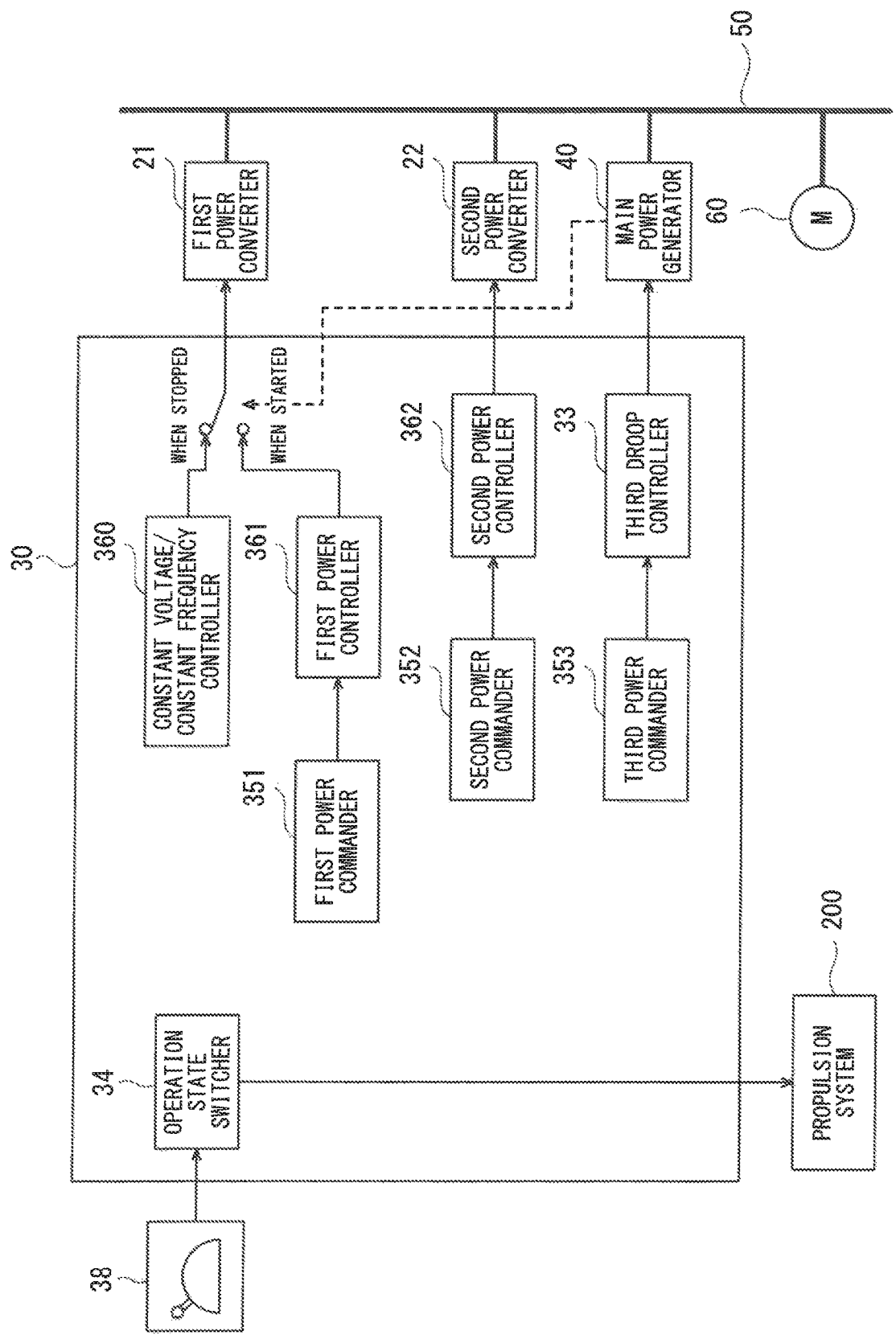
FIG. 3A is a block diagram showing the configuration of the control system according to one variation of Embodiment 1.

Although the first power converter 21 and the second power converter 22 are droop-controlled in the present embodiment, the present embodiment is not thus limited. FIG. 3A is a block diagram showing the configuration of the control system according to one variation of Embodiment 1. As shown in FIG. 3A, in this variation, the control system 30 includes a constant voltage/constant frequency controller 360 and a first power controller 361 instead of the first droop controller 31, and includes a second power controller 362 instead of the second droop controller 32. The first power converter 21 is configured such that the control thereof is instantaneously switchable between constant voltage/constant frequency control and power control. The second power converter 22 is power-controlled. In this configuration, the control system 30 detects the presence or absence of an electric power source that is being operated on the same bus other than the first power storage device 10. When no other electric power source is being operated, the control system 30 gives a command to perform the constant voltage/constant frequency control of the first power converter 21. When any other electric power source is being operated, the control system 30 gives a command specifying electric power to be covered by the first power storage device 10 as the power control of the first power converter 21.

Embodiment 2

Next Embodiment 2 is described. The configuration of a ship including a power system of the present embodiment is the same as the configuration of the ship described in Embodiment 1. Hereinafter, the description of configurational features common between Embodiment 1 and Embodiment 2 is omitted, and differences in configuration from Embodiment 1 are only described.

Figure 5:
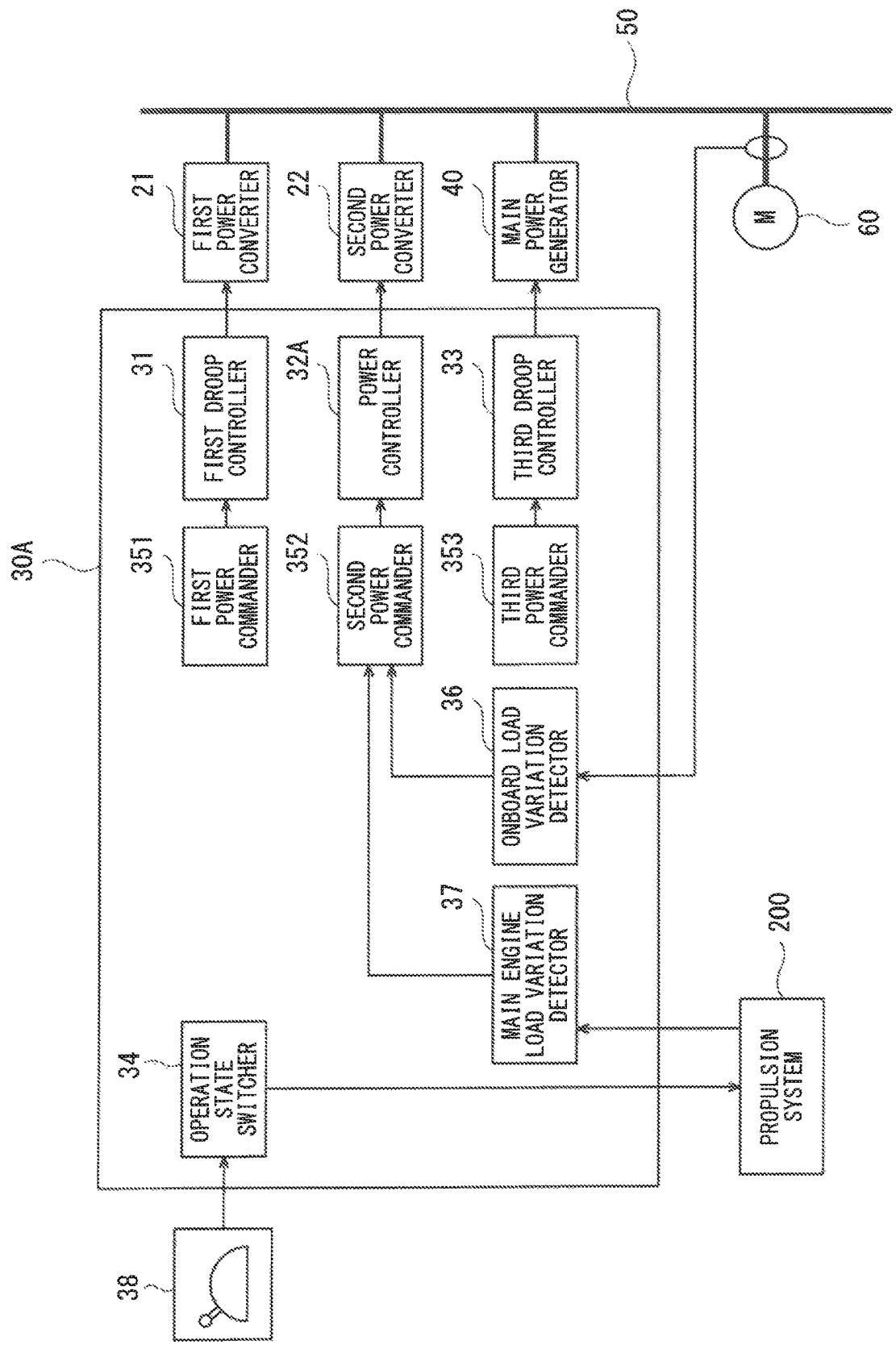
FIG. 5 is a block diagram showing the configuration of a control system in a ship power system according to Embodiment 2.

FIG. 5 is a block diagram showing the configuration of a control system in the ship power system according to Embodiment 2. As shown in FIG. 5, a control system 30A of Embodiment 2 is different from the control system of Embodiment 1 in that the control system 30A further includes an onboard load variation detector 36 and a main engine load variation detector 37, and the power control of the second power converter 22 is performed not by the second droop controller 32 but by a power controller 32A.

The onboard load variation detector 36 detects load variation of the onboard electrical loads 60. As the grid stabilization application, the power controller 32A performs power control of the second power converter 22 to adjust charged/discharged power of the second power storage device 20, such that the load variation detected by the onboard load variation detector 36 is reduced. Load variation of the electrical loads may be directly detected by power meters that are installed on the electrical loads and/or electric power sources, or may be estimated based on frequency variation or voltage variation of the power grid. Alternatively or additionally, the onboard load variation detector 36 detects start or stop signals of the onboard electrical loads 60 that operate for a short time, such as an engine starter motor. Upon detection of such signals, the power controller 32A controls the second power converter 22 such that the second power storage device 20 discharges electric power. According to this configuration, charging/discharging of the second power storage device 20 is performed based on the detection of load variation of the electrical loads. This makes it possible to actively compensate for load variation of the onboard electrical loads 60.

The main engine load variation detector 37 detects load variation of the main engine from the propulsion system 200. The power controller 32A controls the second power converter 22 to adjust charged/discharged power of the second power storage device 20, such that the load variation detected by the main engine load variation detector 37 is reduced. Here, the main engine load variation detector 37 directly detects load variation of the main engine, or estimates load variation of the main engine based on, for example, the rotational speed of the main engine. According to this configuration, charging/discharging of the second power storage device 20 is performed based on the detection of load variation of the main engine. This makes it possible to actively compensate for load variation of the main engine.

Embodiment 3

Next, Embodiment 3 is described. The configuration of a ship including a power system of the present embodiment is the same as the configuration of the ship described in Embodiment 1. Hereinafter, the description of configurational features common between Embodiment 1 and Embodiment 3 is omitted, and differences in configuration from Embodiment 1 are only described.

A control system of the present embodiment is the same as the control system of Embodiment 1 in the following respect: either the first power storage device 10 or the second power storage device 20 is used in at least one of the above-described power generator application, grid stabilization application, and main engine load variation compensation application. The control system of the present embodiment is different from the control system of Embodiment 1 as follows. The control system of the present embodiment obtains a first predetermined value and a second predetermined value for each application. The first predetermined value corresponds to the electrical energy of necessary charging/discharging for the application, and the second predetermined value corresponds to the electric power of the necessary charging/discharging for the application. If the first predetermined value is greater than the second predetermined value, the control system prioritizes charging/discharging the first power storage device 10 over charging/discharging the second power storage device 20. If the second predetermined value is greater than the first predetermined value, the control system prioritizes charging/discharging the second power storage device 20 over charging/discharging the first power storage device 10. For example, the first predetermined value of 0 to 1 corresponds to 0 kWh to the capacity of the first power storage device (in the above-described example, 400 kWh), and the second predetermined value of 0 to 1 corresponds to 0 kW to the output power of the second power storage device (in the above-described example, 1000 kW).

It should be noted that, in order to determine necessary electrical energy for a particular application, a time for which the application continues needs to be determined. As one example, at the time of mooring of the ship, a time for which the ship is scheduled to be moored may be inputted by a ship crew. Thus, a ship crew may explicitly give time information. Alternatively, by using machine learning technique, the electrical energy of current charging/discharging and current usage of devices may be compared with past operation histories of the ship, and thereby an operating time may be estimated.

Figure 6:
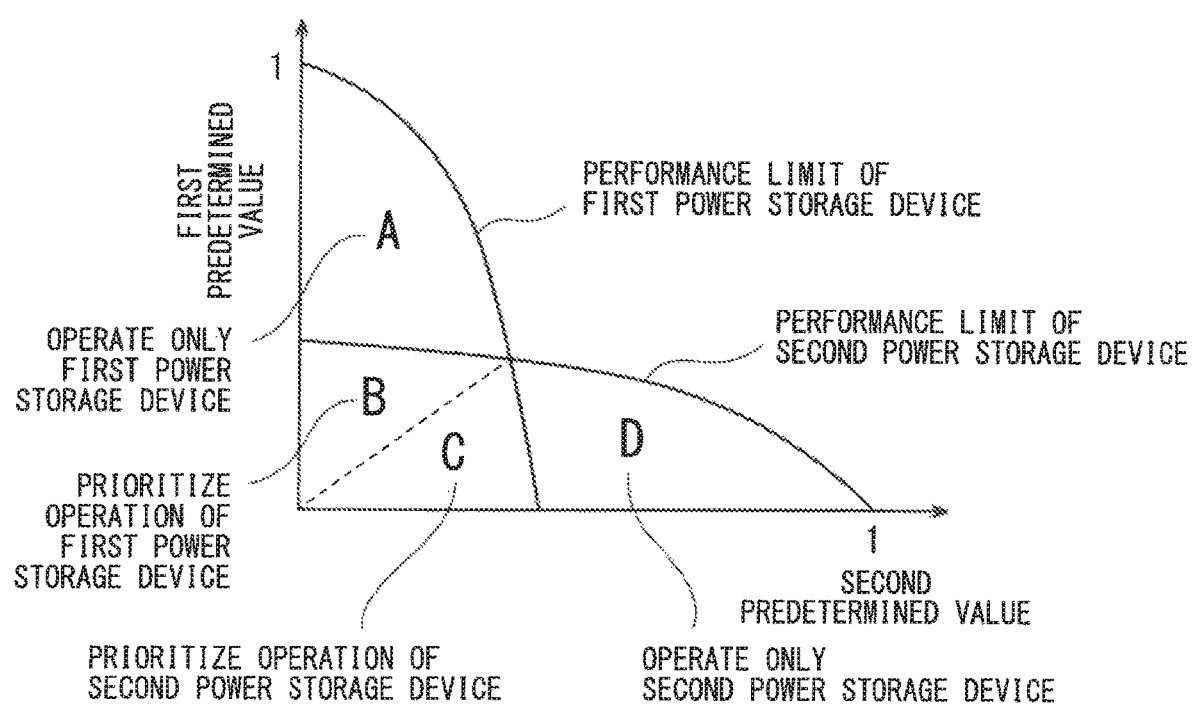
FIG. 6 is a graph showing the performance limit of a first power storage device and the performance limit of a second power storage device.

FIG. 6 is a graph showing the performance limit of the first power storage device and the performance limit of the second power storage device. The vertical axis represents the first predetermined value, and the horizontal axis represents the second predetermined value. For each application, the control system calculates the first predetermined value based on the electrical energy of necessary charging/discharging for the application and the second predetermined value based on the electric power of the necessary charging/discharging for the application. In FIG. 6, region A is a region where the first predetermined value exceeds the performance limit of the second power storage device. Therefore, the first power storage device is operated in region A. Region D is a region where the second predetermined value exceeds the performance limit of the first power storage device. Therefore, the second power storage device is operated in region D.

Regions B and C are regions where both the power storage devices can be used. Therefore, the first predetermined value corresponding to the electrical energy of the charging/discharging and the second predetermined value corresponding to the electric power of the charging/discharging are compared with each other. If the first predetermined value is greater than the second predetermined value, charging/discharging the first power storage device 10 is prioritized over charging/discharging the second power storage device 20 (region B). If the second predetermined value is greater than the first predetermined value, charging/discharging the second power storage device 20 is prioritized over charging/discharging the first power storage device 10 (Region C).

As described above, by suitably using the different power storage devices in accordance with the magnitude of electrical energy and the magnitude of electric power in each application, even though the total size of the power storage devices is small, these power storage devices can be applied to the ship power system.

It should be noted that, in the present embodiment, at least one of the first power storage device 10 and the second power storage device 20 may be used for at least one of the above-described power generator application and grid stabilization application. Also in such a case, the first predetermined value corresponding to the electrical energy of the necessary charging/discharging and the second predetermined value corresponding to the electric power of the necessary charging/discharging are obtained for each application, and if the first predetermined value is greater than the second predetermined value, charging/discharging the first power storage device 10 is prioritized over charging/discharging the second power storage device 20, whereas if the second predetermined value is greater than the first predetermined value, charging/discharging the second power storage device 20 is prioritized over charging/discharging the first power storage device 10.

(Variations)

Figure 7:
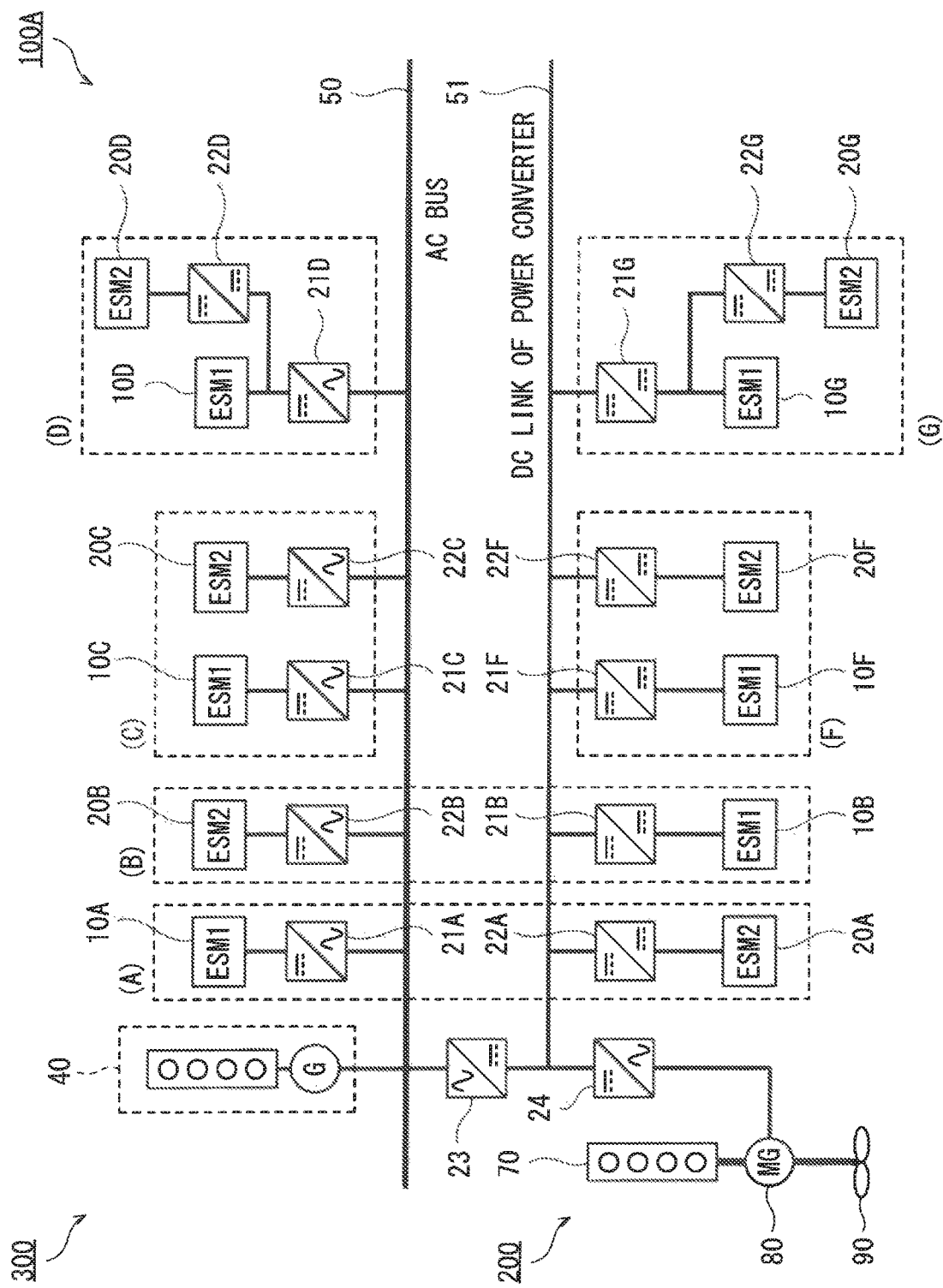
FIG. 7 schematically shows the configuration of a ship including ship power systems according to first variations.

In the above-described embodiments, the first power storage device 10 and the second power storage device 20 are connected to the onboard AC bus 50 via separate power converters (see FIG. 1). However, the embodiments are not limited to such a configuration. Alternatively, the first power storage device 10 and the second power storage device 20 may be connected to the onboard AC bus 50 via a shared power converter. Further alternatively, the first power storage device 10 and the second power storage device 20 may be connected, via separate power converters, to a DC link of a power converter provided for driving a motor generator or electric motor. FIG. 7 schematically shows the configuration of a ship including ship power systems according to variations (A), (B), (C), (D), (F), and (G). It should be noted that (A), (B), (C), (D), (F), and (G) surrounded by dashed lines in FIG. 7 correspond to the respective variations. Therefore, the ship may include only one of, or two or more of, the configurations (A), (B), (C), (D), (F), and (G) surrounded by the dashed lines. As shown in FIG. 7, first power storage devices 10A, 10C, 10D and second power storage devices 20B, 20C, 20D are connected to the onboard AC bus 50 via separate power converters 21A, 22B, 21C, 22C, 21D, and 22D. Also, first power storage devices 10B, 10F, 10G and second power storage devices 20A, 20F, 20G are connected via separate power converters 22A, 21B, 21F, 22F, 21G, and 22G to the DC link 51 of the third power converter 23 and the fourth power converter 24, which are provided for driving the motor generator 80.

Figure 8:
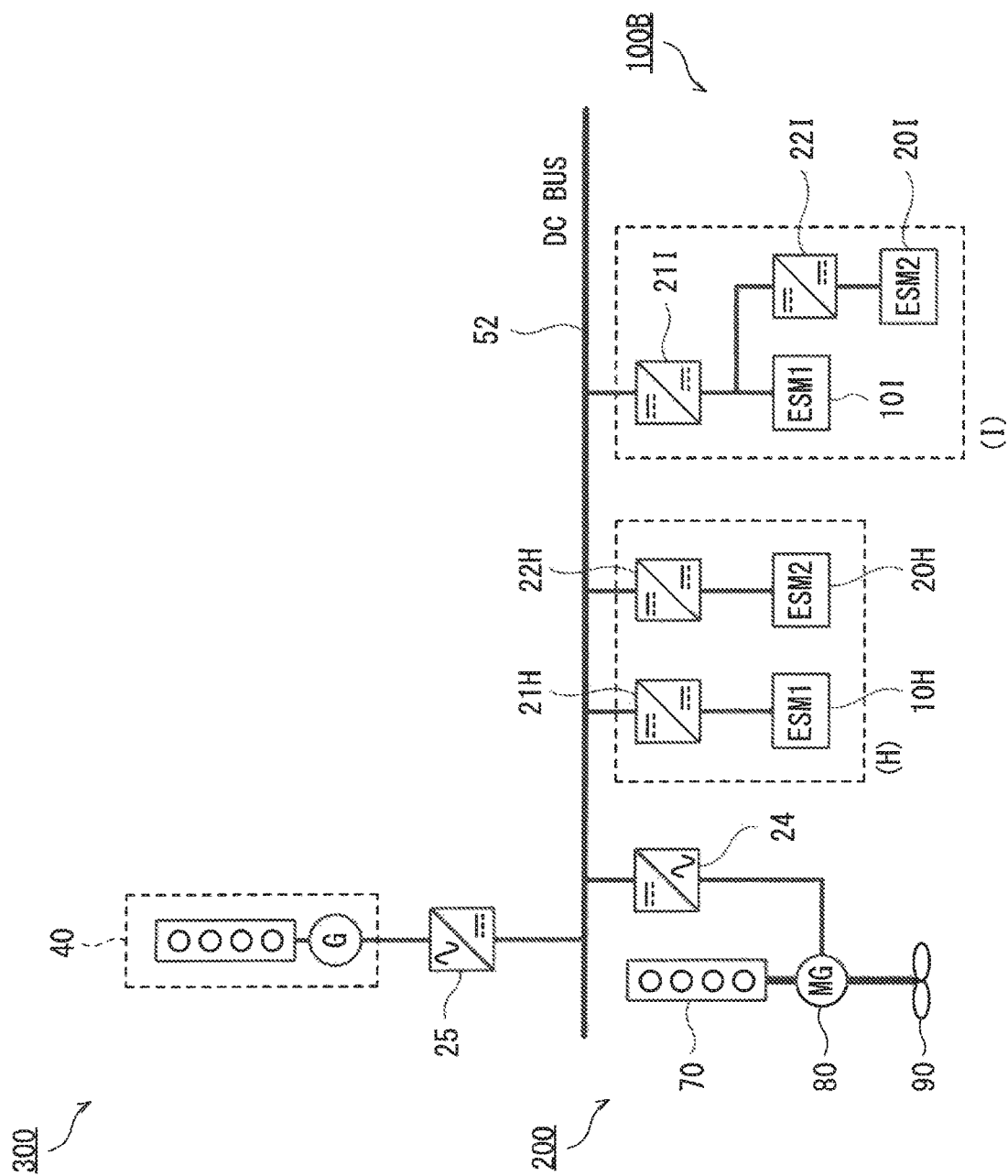
FIG. 8 schematically shows the configuration of a ship including ship power systems according to second variations.

Alternatively, the first power storage devices and the second power storage devices may be connected to an onboard DC bus via separate power converters. FIG. 8 schematically shows the configuration of a ship including ship power systems according to variations (H) and (I). It should be noted that (H) and (I) surrounded by enclosing lines in FIG. 8 correspond to the respective variations. In practice, the ship may include one of or both the configurations (H) and (I) surrounded by the enclosing lines. As shown in FIG. 8, first power storage devices 10H and 10I and second power storage devices 20H and 20I are connected to an onboard DC bus 52 via separate power converters 21H, 22H, 21I, and 22I. The main power generator 40 is connected to the onboard DC bus 52 via a zeroth power converter 25.

In the configuration of FIG. 8, the zeroth power converter 25 and the first power converter 21H may be droop-controlled by a controller (not shown), and the second power converter 22H may be droop-controlled or power-controlled. In this case, the droop characteristic is the relationship between active power and DC voltage, and is set such that the greater the active power, the lower the DC voltage. A value resulting from dividing the difference between the DC voltage at the time of rated load and the DC voltage at the time of no load by a rated DC voltage is defined as a droop rate. Normally, the droop rate is set to the same value for each electric power source. However, as an alternative, the droop rate may be set to a different value for each electric power source as necessary. Each of the zeroth power converter 25 and the first power converter 21H detects the active power, determines a DC voltage target value based on the droop characteristic, and operates by voltage control. Desirably, the speed at which voltage variation follows load variation is set to be the same between both the power converters. Since the operations of the system will be understood by replacing the term "frequency" in FIGS. 4A to 4C with "voltage", the detailed description thereof is omitted herein.

In the configuration of FIG. 8, the zeroth power converter 25 may be droop-controlled by an attached controller (not shown); the first power converters 21H and 21I may be configured such that the control thereof is instantaneously switchable between constant voltage control and power control; and the second power converters 22H and 22I maybe power-controlled. The control system detects the presence or absence of an electric power source that is being operated on the same bus other than the first power storage devices 10H and 10I. When no other electric power source is being operated, the control system gives a command to perform the constant voltage control of the first power converters 21H and 21I. When any other electric power source is being operated, the control system gives a command specifying electric power to be covered by the first power storage devices 10H and 10I as the power control of the first power converters 21H and 21I.

Other Embodiments

Figure 9:
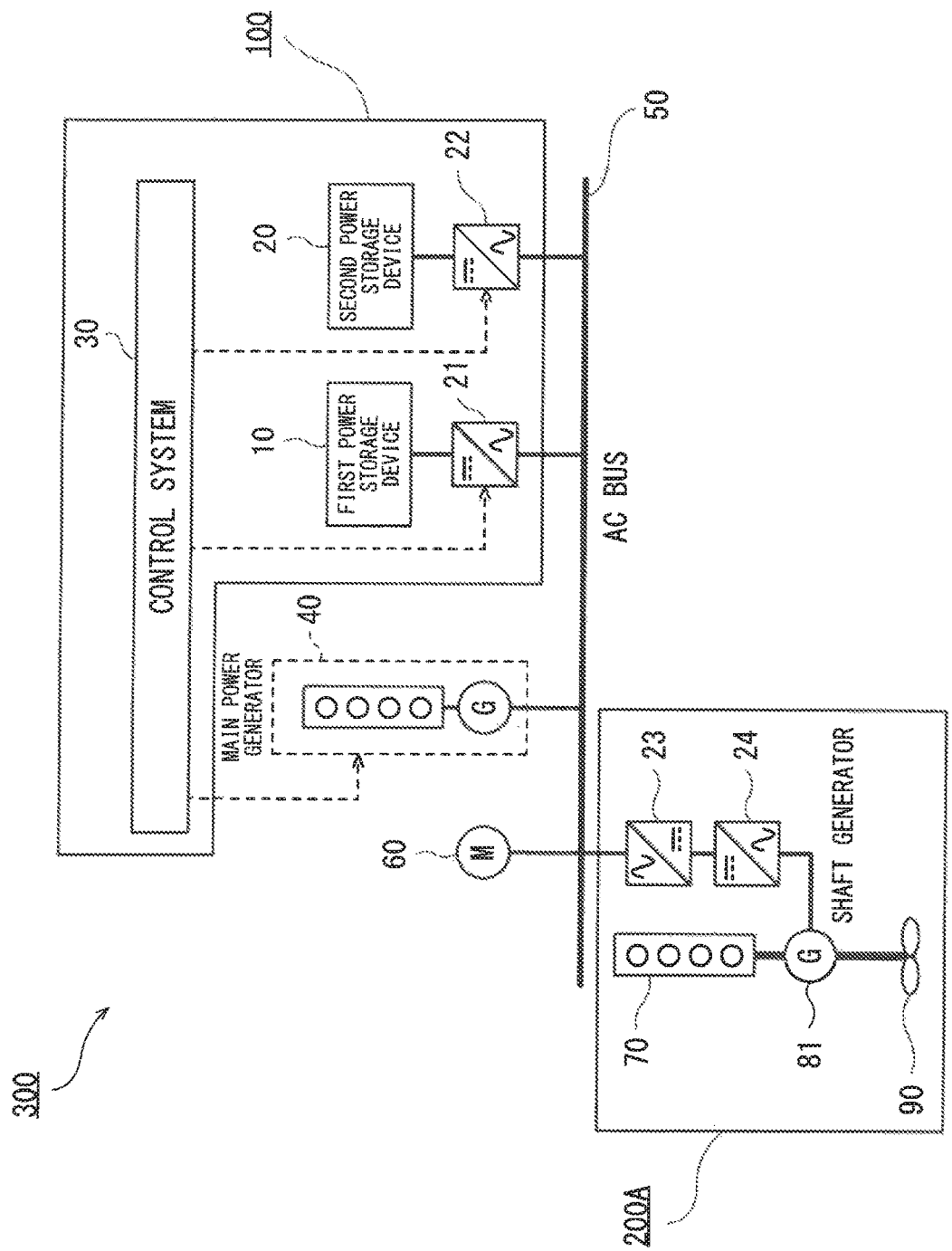
FIG. 9 schematically shows the configuration of another ship including the above ship power system.
Figure 10:
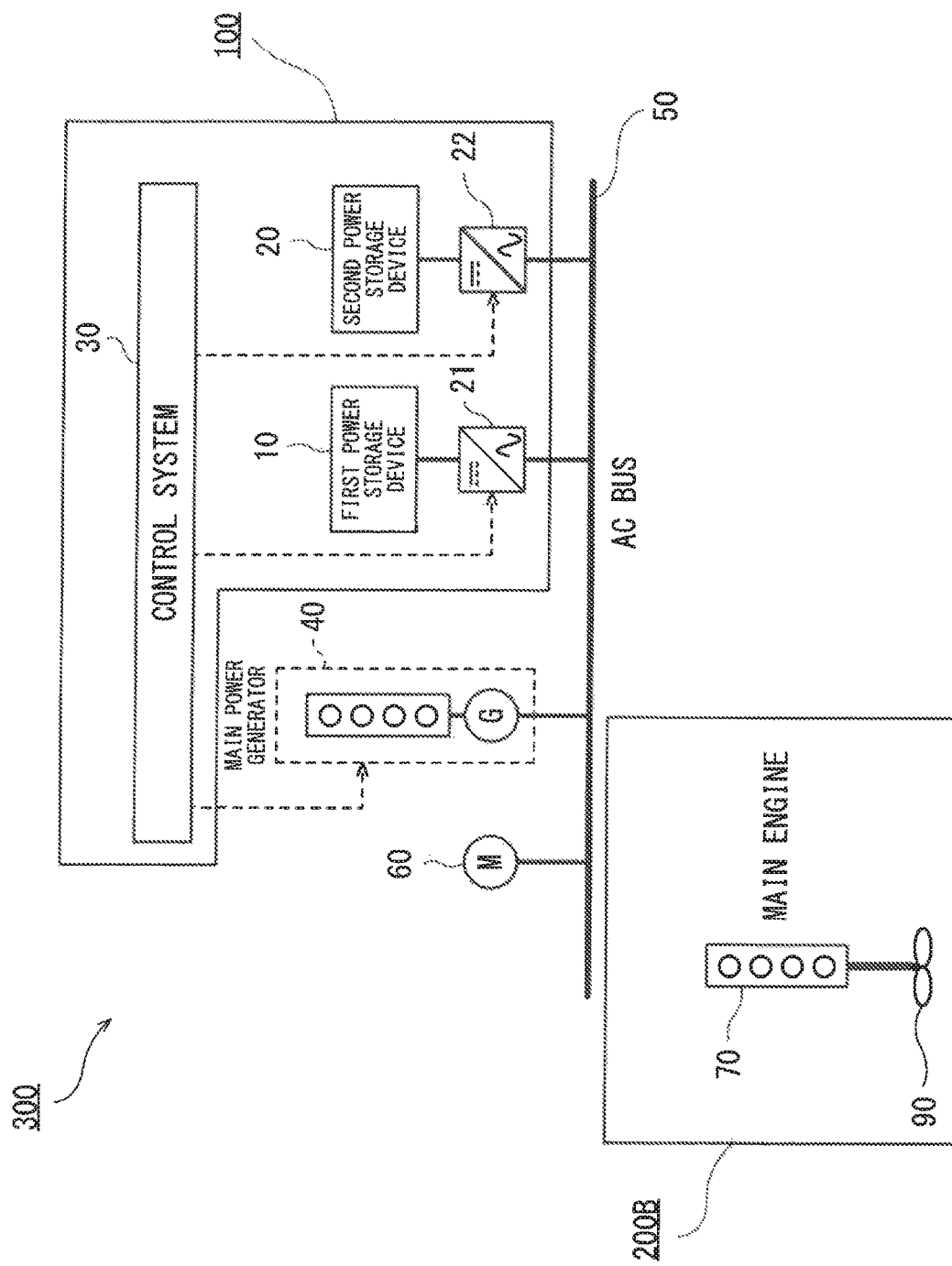
FIG. 10 schematically shows the configuration of yet another ship including the above ship power system.
Figure 11:
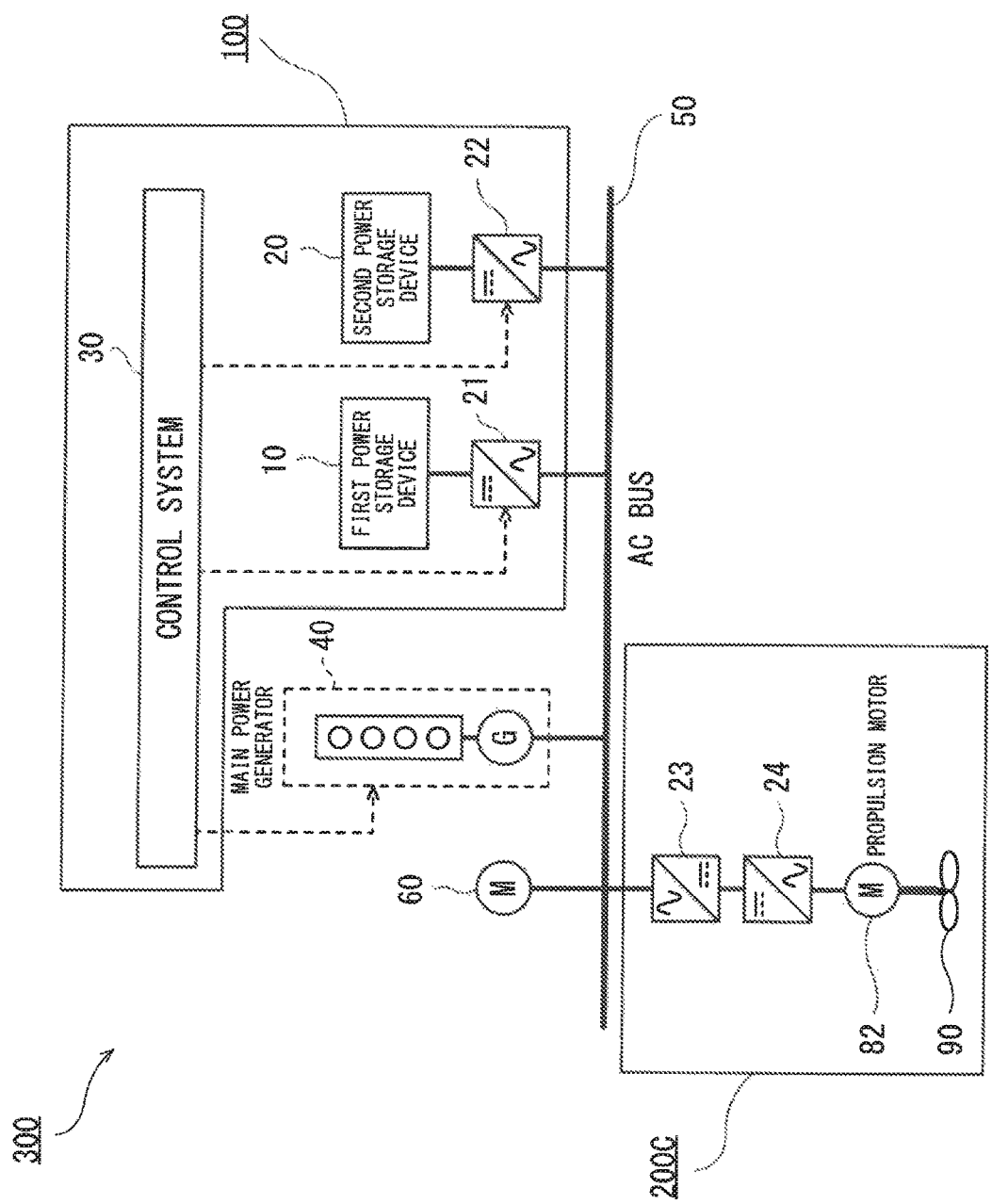
FIG. 11 schematically shows the configuration of yet another ship including the above ship power system.

In the above-described embodiments, the ship 300 is a hybrid ship. However, as an alternative, the ship 300 may be an electrically propelled ship, a mechanically propelled ship mounted with a shaft generator, or other mechanically propelled ship. Each of FIG. 9 to FIG. 11 schematically shows the configuration of another ship including the above-described ship power system 100. Also in these cases, the control system 30 is configured to, as the power generator application, prioritize discharging the first power storage device over discharging the second power storage device 20, and as the grid stabilization application, prioritize charging/discharging the second power storage device 20 over charging/discharging the first power storage device 10. The ship 300 in FIG. 9 is a mechanically propelled ship mounted with a shaft generator. A propulsion system 200A of the mechanically propelled ship mounted with a shaft generator is a shaft generator propulsion system. The shaft generator propulsion system is configured to operate a shaft generator 81 to assist the main power generator 40 in generating electric power, and drive the propeller 90 by the thrust of the main engine 70. Alternatively, the main power generator 40 may be stopped. In FIG. 9, the control system 30 is configured to, as the main engine load variation compensation application, prioritize charging/discharging the second power storage device 20 over charging/discharging the first power storage device 10 to adjust the electric power generated by the shaft generator 81 to reduce load variation of the main engine 70.

The ship 300 in FIG. 10 is a mechanically propelled ship. A propulsion system 200B of the mechanically propelled ship is a mechanical propulsion system. In the mechanical propulsion system, the main engine 70 is independent of the main power generator 40, and the mechanical propulsion system is configured to drive the propeller 90 only by the thrust of the main engine 70. The ship 300 in FIG. 11 is an electrically propelled ship. A propulsion system 200C of the electrically propelled ship is configured to operate a propulsion motor 82 to drive the propeller 90 by electric propulsive force. In FIG. 11, the control system 30 is configured to, as the main engine load variation compensation application, prioritize charging/discharging the second power storage device 20 over charging/discharging the first power storage device 10 to adjust the driving of the propulsion motor 82 to reduce load variation of the main engine. The above-described embodiments and variations are suitably applicable to the propulsion systems 200A to 200C of FIG. 9 to FIG. 11 in accordance with the mode of each system.

From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

INDUSTRIAL APPLICABILITY

The present invention is useful for a power system that is used as an auxiliary power supply of a ship

REFERENCE SIGNS LIST 10 first power storage device
20 second power storage device
21 first power converter
22 second power converter
23 third power converter
24 fourth power converter
25 zeroth power converter
30 control system
31 first droop controller
32 second droop controller
32A power controller
33 third droop controller
34 operation state switcher
36 onboard load variation detector
37 main engine load variation detector
38 console
40 main power generator
50 onboard bus (AC)
51 DC link
52 onboard bus (DC)
60 onboard electrical load
70 main engine
80 propulsion motor generator
81 shaft generator
82 propulsion motor
90 propeller
100, 100A, 100B power system
200, 200A, 200B, 200C propulsion system
300 ship
351 first power commander
352 second power commander
353 third power commander
360 constant voltage/constant frequency controller
361 first power controller
362 second power controller

The invention claimed is:

1. A power system of a ship, the power system comprising:
   a first power storage device mounted to an onboard bus;
   a second power storage device mounted to the onboard bus; and
   a control system configured to control charging/discharging of the first power storage device and the second power storage device, wherein
   the first power storage device has an energy density higher than that of the second power storage device,
   the second power storage device has a power density higher than that of the first power storage device, and
   the control system:
      when using at least one of the first power storage device and the second power storage device in at least one of (i) a power generator application for continuously supplying base power to an onboard electrical load connected to the onboard bus and (ii) a grid stabilization application for compensating for frequency variation or voltage variation of an onboard power grid,
         calculates necessary electrical energy for each application based on pre-inputted times for which the respective applications continue or based on operating times of the respective applications, the operating times being estimated by using machine learning technique, and
         obtains a first predetermined value and a second predetermined value for each application, the first predetermined value corresponding to electrical energy of necessary charging/discharging for the respective application, the second predetermined value corresponding to electric power of necessary charging/discharging for the respective application, the first predetermined value being in a range of 0 to 1, in which 0 corresponds to 0 kWh and 1 corresponds to a capacity of the first power storage device, the second predetermined value being in a range of 0 to 1, in which 0 corresponds to 0 kW and 1 corresponds to output power of the second power storage device;
      if the first predetermined value is greater than the second predetermined value, prioritizes charging/discharging the first power storage device over charging/discharging the second power storage device, and
      if the second predetermined value is greater than the first predetermined value, prioritizes charging/discharging the second power storage device over charging/discharging the first power storage device.

2. The power system of the ship according to claim 1, wherein
   the ship includes a propulsion system configured such that a propeller is connected to a main engine and connected to a propulsion motor, a shaft generator, or a propulsion motor generator, and
   the control system:
      when using at least one of the first power storage device and the second power storage device in at least one of (i) the power generator application, (ii) the grid stabilization application, and (iii) a main engine load variation compensation application for adjusting driving of, or electric power generated by, the propulsion motor, the shaft generator, or the propulsion motor generator to reduce load variation of the main engine,
         calculates necessary electrical energy for each application based on pre-inputted times for which the respective applications continue or based on operating times of the respective applications, the operating times being estimated by using machine learning technique, and
         obtains the first predetermined value and the second predetermined value for each application, the first predetermined value corresponding to electrical energy of necessary charging/discharging for the respective application, the second predetermined value corresponding to electric power of necessary charging/discharging for the respective application, the first predetermined value being in the range of 0 to 1, in which 0 corresponds to 0 kWh and 1 corresponds to the capacity of the first power storage device, the second predetermined value being in the range of 0 to 1, in which 0 corresponds to 0 kW and 1 corresponds to the output power of the second power storage device;
      if the first predetermined value is greater than the second predetermined value, prioritizes charging/discharging the first power storage device over charging/discharging the second power storage device; and
      if the second predetermined value is greater than the first predetermined value, prioritizes charging/discharging the second power storage device over charging/discharging the first power storage device.

3. The power system of the ship according to claim 1, wherein
the first power storage device is a battery, and
the second power storage device is a capacitor.

4. The power system of the ship according to claim 1, comprising:
a main power generator connected to the onboard bus; and
a first power converter connected between the onboard bus and the first power storage device, wherein
in the power generator application, the control system controls the first power converter such that when the first power storage device is able to supply, alone or in parallel with the main power generator, electric power at least to the onboard electrical load, if an unexpected output shortage of the main power generator occurs, the electric power is automatically discharged from the first power storage device.

5. The power system of the ship according to claim 1, comprising:
a main power generator connected to the onboard bus;
a first power converter connected between the onboard bus and the first power storage device; and
a second power converter connected between the onboard bus and the second power storage device, wherein
in the grid stabilization application, the control system controls the second power converter such that charged/discharged power of the second power storage device has a droop characteristic against frequency or voltage, and such that a speed at which frequency variation or voltage variation of the second power storage device follows active power variation is slower than a speed at which frequency variation or voltage variation of the main power generator or the first power storage device follows the active power variation.

6. The power system of the ship according to claim 1, comprising:
a main power generator connected to the onboard bus;
a first power converter connected between the onboard bus and the first power storage device; and
a second power converter connected between the onboard bus and the second power storage device, wherein
in the grid stabilization application, the control system detects load variation of the onboard electrical load, and controls the second power converter to adjust charged/discharged power of the second power storage device, such that the load variation is reduced.

7. The power system of the ship according to claim 1, wherein
the first power storage device and the second power storage device is are connected to the onboard bus of the ship via separate power converters, and
the onboard bus of the ship is an AC bus.

8. The power system of the ship according to claim 1, wherein
the first power storage device and the second power storage device is are connected to the onboard bus of the ship via separate power converters, and
the onboard bus of the ship is a DC bus.

9. The power system of the ship according to claim 1, wherein
the ship includes a first power converter, a second power converter, a third power converter, and a fourth power converter,
the third power converter and the fourth power converter are for driving a motor generator or an electric motor, and
the first power storage device or the second power storage device is connected to a DC link of the third power converter and the fourth power converter via the first power converter and the second power converter, with the proviso that the first power converter and the second power converter are separate power converters.

* * * * *